July 9, 1957
G. B. TODD
2,798,604
EXTRUSION
Filed April 20, 1956
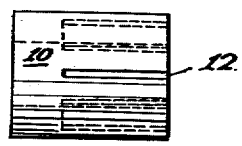
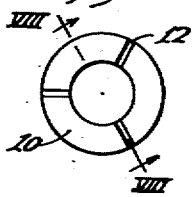
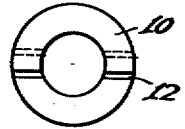
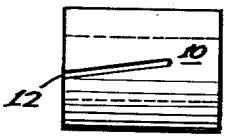
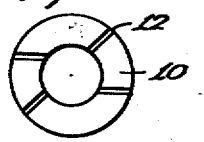
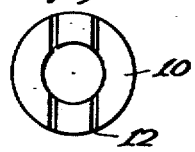
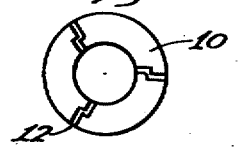
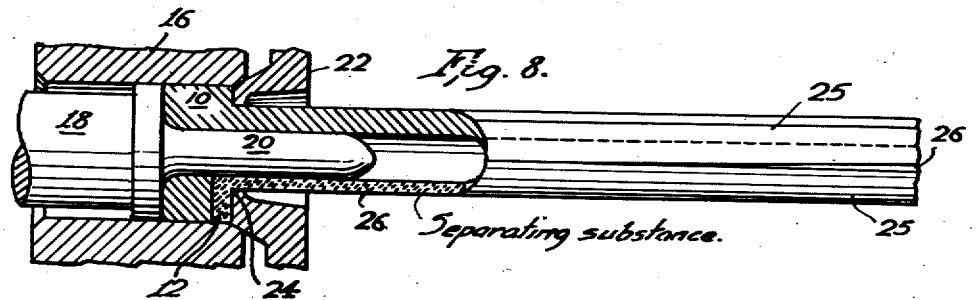
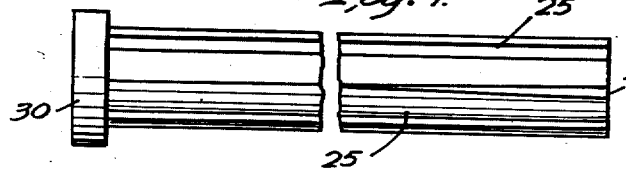
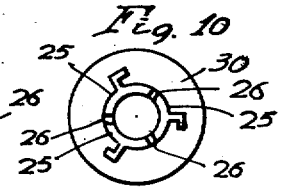
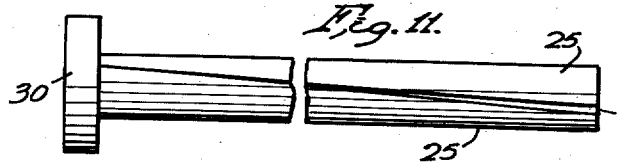
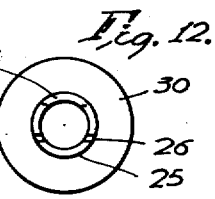
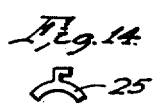
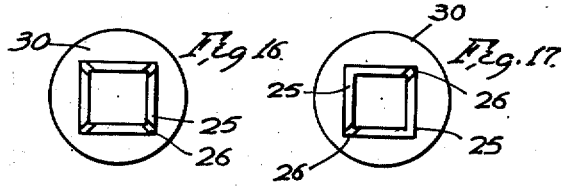
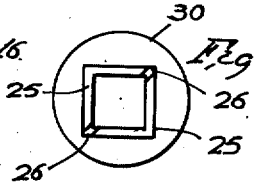
INVENTOR.
George B. Todd.
BY
S. Ernest Low.
ATTORNEY

United States Patent Office 2,798,604
Patented July 9, 1957

2,798,604

EXTRUSION

George B. Todd, Oakmont, Pa., assignor to Aluminum Company of America, Pittsburgh, Pa., a corporation of Pennsylvania Application April 20, 1956, Serial No. 579,662

5 Claims. (Cl. 207—10)

The present invention relates to the art of metal working and is more specifically concerned with the preparation and extrusion of metal billets in the simultaneous fabrication of a plurality of extruded sections from a one-piece integral billet. This application is a continuation-in-part of my allowed application, Serial No. 279,813, filed April, 1952, now abandoned.

The invention has for its main object the provision of an extrusion process in which a billet is subjected to extrusion through a single die orifice to produce simultaneously a plurality of separable or separated extruded sections.

Another object of the invention is to provide an extrusion method for the production of one or more extruded sections in integral association with an unextruded portion of a billet undergoing extrusion.

Other objects and advantages will become evident to those skilled in the extrusion art on consideration of the following description and drawing, forming a part hereof, in which:

Fig. 1 represents a side elevational view of a tubular extrusion billet prepared in accordance with the invention;

Fig. 2 represents an end elevational view of the billet of Fig. 1;

Fig. 3 represents a side elevational view of an alternative form of tubular extrusion billet;

Fig. 4 represents an end elevational view of the billet of Fig. 3;

Figs. 5, 6 and 7 represent end elevational views of alternative forms of tubular extrusion billets;

Fig. 8 represents a fragmentary, partial sectional view, taken on the plane VIII—VIII of Fig. 2 through an extrusion mechanism illustrating the performance of an extrusion operation on the billet of Figs. 1 and 2;

Fig. 9 represents a side elevational view of the extruded product removed from the mechanism of Fig. 8;

Fig. 10 represents an end elevational view of the extruded product of Fig. 9;

Fig. 11 represents a schematic side elevational view of an extruded product produced from the billet of Figs. 3 and 4;

Fig. 12 represents an end elevational view of the section of Fig. 11;

Fig. 13 represents a side elevational view of an extruded section sheared from the product of Figs. 9 and 10;

Fig. 14 represents an end elevational view of the section of Fig. 13;

Fig. 15 represents an end elevational view of a transformation of the section of Figs. 13 and 14;

Fig. 16 represents an end elevational view of a modified form of extruded product produced in accordance with the invention; and Fig. 17 represents an end elevational view of a further modified form of extruded product made in accordance with the invention.

The invention is not limited to any particular class of metals or alloys and may be practiced with equally good results in the ferrous and non-ferrous fields, the light metals represented by aluminum, magnesium and their alloys, being readily worked in accordance with the teachings of the invention in the production of light weight structural members.

A general adaptation and practice of the invention comprises the steps of preparing a cast, rolled or forged tubular billet of a selected metal or alloy by severing through the wall thereof at two or more circumferentially spaced points to an axial length less than that of the billet. A separating material, substance or compound is thereafter provided between the adjacent surfaces of the severed wall to prevent the formation of a metallurgical bond or mechanical anchorage between the severed surfaces under the pressures and temperatures required to extrude the so-prepared billet. Subsequent extrusion of the billet prepared as above described, results in the production of two or more extruded members or sections integrally attached to the unservered portion of the original billet. The individual extruded sections are preferably sheared from the unsevered portion of the billet, but if desired, one or more of the extruded sections may remain attached for subsequent metal working operations.

Reference is made herein to the co-pending continuation-in-part United States application for patent, in the name of Carl R. Anderson, Serial No. 577,889, filed April 12, 1956, for examples and types of non-metallic separating substances suitable for carrying out the present invention.

Referring to the appended drawing for a more specific description of the invention, a billet 10 is selected of a desired metal or alloy composition. The billet 10 is tubular in form and is preferably a hollow right cylinder which adapts itself to standard extrusion equipment. The wall of the billet is sliced, slotted, or otherwise severed at 12, as by sawing, forging, machining, or the like, at two or more circumferentially spaced points extending less than the axial length of the billet 10, but the slots may be of varying length. The slots 12 are preferably disposed on radial planes (Fig. 2), but may be located and take the various forms illustrated in Figs. 5, 6 and 7. Furthermore, the slots 12 are preferably disposed in axial planes parallel with the longitudinal axis of the billet 10 (Figs. 1 and 2), but may be other than parallel with the axis of the billet, as illustrated in Figs. 3, 4, 11 and 12.

A suitable separating, bond or anchorage-preventing material or substance, preferably a non-metallic composition, such as chemically or electrolytically produced coatings and/or non-metallic lubricants described in the aforementioned continuation-in-part co-pending application, Serial No. 577,889, is supplied on or between the adjacent surfaces of the slots 12 prior to the extrusion of the billet 10. It is essential to the success of the invention that the separating substances prevent the formation of a mechanical anchorage or metallurgical bond at any time during the extrusion operation.

Any one of the prepared billets 10 is thereafter charged into the container 16 of an extrusion press and the ram 18 and its mandrel 20 advanced to position the nose of the mandrel through a die aperture 24 in a die block 22 in pressure-resistant relationship in respect to the cylinder or container 16. Application of pressure on the billet 10 by the ram 18 initially expands or upsets the billet axially to completely fill out the annular space formed between the outside surface of mandrel 20 and inside surface of container 16. Continued application of pressure forces the metal of billet 10 through the single die orifice formed between the mandrel 20 and die aperture 24.

The billets 10 are initially and preferably charged into the press container 16 with their unsevered butt end portions adjacent the ram 18, and the extruded portions of the billets are produced in the form of separated extruded members or sections 25 which spring open along planes 26 (Figs. 8, 9, 10, 11, 12, 16 and 17) in substantial registry with the separating slots 12 in the original billets, as the extrusion operation progresses. The extrusion operation is also preferably interrupted when the longest slot 12 in the billet 10 reaches the die orifice 24. However, it is not imperative that the extrusion operation be halted at the exact end of the longest slot, or in the plane of all of the slots in the case of common termination, since in any case the point of severance is normally determined by the unextruded butt or the end of the slot or slots in the extruded portion of the billet if extrusion has proceeded beyond the end of the slot or slots. In normal practice of the invention, it has been observed that the separating planes 26 are in compressed relationship adjacent the unextruded portion 30 of a billet 10 at the termination of an extrusion operation (Figs. 9 and 11). Even this compressed relationship has been found to be less than a metallurgical bond or mechanical anchorage.

It will be observed on reference to Figs. 9, 10, 11 and 12 that extruded products of generally right cylindrical tubular form have been produced, which comprise unextruded butt portions 30 and integrally attached or connected, longitudinally separated extruded members or sections 25.

Figs. 16 and 17 illustrate unextruded butt portions 30 with integrally connected, longitudinally separated extruded members 25 in generally rectangular hollow arrangement in respect to the unextruded butt portions of the starting extrusion billets. These types of products would result by merely replacing the cylindrical mandrel 20 with a mandrel of rectangular cross-section and employing a cooperating rectangular female die therewith.

It should also be observed from Figs. 3, 11 and 12, which illustrate a practice of the invention employing slots 12 which are other than parallel with the axis of the extrusion, that the planes 26 of separation between adjacent members 25 will assume some form schematically illustrated in Fig. 11.

The preferred commercial and most economical use of the invention is realized when the billet 10 is slotted at 12 in a manner to substantially equally divide the metal of the billet along planes which are radially disposed and axially parallel to the direction of extrusion in the production of members 25 which are characterized by being of substantially uniform cross-sectional area and weight per running foot.

The individual sections 25 are preferably sheared off the butt 30, examples of which are illustrated in Figs. 13 and 14. The individual sections 25 may be transformed, as by a flattening operation, to produce a section 32, Fig. 15.

The butt 30 is illustrated in Figs. 9 and 11 as being materially less in thickness than the unsevered left hand end portion of the billet of Figs. 1, 3 and 8. This reduction in thickness is accounted for by a heel cropping step, which is usually employed to remove the end or heel of an extrusion billet.

If desired, less than all the sections 25 may be sheared from the butt 30 and the butt 30 forged to provide one or more extrusions 25 with an integrally attached, thickened hub or terminal portion. This operation lends itself to the production of shapes suitable for use as spars in aircraft wing construction.

The slots or openings 12 in the initial one-piece integral tubular billet have been described in terms of having been produced by a slitting or severing step, as by a sawing, forging, machining, or similar operation. It will be understood that the slots 12 could be produced in other known manners, as for example while the billet is being cast, without in any way detracting from the scope of the invention.

Specific instructions and illustrations have been used in describing the present invention. It is to be understood that the invention is not to be limited to the precise description except as defined in the appended claims.

What is claimed is:

1. In a method of simultaneously extruding a plurality of sections, the steps comprising, selecting an initial one-piece integral metal extrusion billet in substantially tubular form having openings through the wall thereof extending axially less than the length of the billet at circumferentially separated points, supplying a metallurgical bond- and anchorage-preventing material between adjacent surfaces of the axially extending openings through the billet wall, extruding less than the entire length of the thus prepared billet in a single substantially tubular form constituted by a plurality of adjacently separated extruded sections in integral end-attachment to the unextruded portion of the billet, and severing at least one of the extruded sections from the unextruded portion of the billet.

2. In a method of simultaneously extruding a plurality of sections, the steps comprising, selecting an initial one-piece integral metal extrusion billet of desired composition, in substantially tubular form, slitting through the wall of the tubular billet at a plurality of circumferentially spaced points, extending the slits axially less than the length of the billet, providing a metallurgical bond- and anchorage-preventing material between adjacent surfaces of the slits in the billet, extruding less than the entire length of the billet in a single substantially tubular form constituted by a plurality of adjacently separated extruded sections over their entire axial lengths in integral end attachment to the unextruded portion of the billet, and cropping off the unextruded portion of the billet to produce a plurality of separate detached extruded sections.

3. In a method of extrusion, the steps comprising, selecting a one-piece integral metallic billet in substantially tubular form, severing through the wall of the billet at spaced points and extending the severed wall lengths axially less than the length of the billet, supplying a metallurgical bond- and anchorage-preventing material between adjacent severed surfaces of the billet, extruding less than the entire length of the thus prepared billet in a single substantially tubular form to provide an unextruded axially unsevered butt and integrally end-attached adjacently separated extruded sections, and severing at least one of the extruded sections from the butt.

4. In a method of simultaneously extruding a plurality of sections, the steps comprising, selecting an initial one-piece integral metal extrusion billet of desired composition, in substantially tubular form, slitting through the wall of the tubular billet at a plurality of circumferentially spaced points, extending the slits axially less than the length of the billet, providing a metallurgical bond- and anchorage-preventing material between adjacent surfaces of the slits in the billet, charging the billet into an extrusion press with its unsevered butt end adjacent the ram of the press, extruding less than the entire length of the billet in a single substantially tubular form to at least the extent of the longest slit in the billet to provide adjacently separated extruded sections in integral end-connection to the unextruded portion of the billet, and cropping off the unextruded portion of the billet to produce a plurality of separate detached extruded sections.

5. In a method of simultaneously extruding a plurality of sections, the steps comprising, selecting an initial one-piece integral metal extrusion billet of desired composition, in substantially right cylindrical form, slitting through the wall of the tubular billet at a plurality of equally spaced circumferential points on planes radial to the center of the billet, extending the radial slits from one end of the billet in planes axially parallel to the longitudinal axis of the billet and less than the length thereof, providing a metallurgical bond- and anchlorage-preventing material between adjacent surfaces of the slits, confining the right cylindrical billet between an extrusion press container and central mandrel cooperating with a female die to provide a single die orifice, expressing less than the entire length of the billet through the single die orifice, to at least the extent of the longest axial slit to produce a substantially tubular extrusion comprising a plurality of substantially similar, axially separated extrusions integrally connected to the unextruded portion of the original billet, and cropping the separated extrusions.

References Cited in the file of this patent

UNITED STATES PATENTS

| | | |
|---|---|---|
| 837,707 | Mouterde | Dec. 4, 1906 |
| 1,233,764 | Dunham | July 17, 1917 |
| 2,149,223 | Mason | Feb. 28, 1939 |
| 2,168,381 | Woodford | Aug. 8, 1939 |
| 2,458,686 | Davie | Jan. 11, 1949 |
| 2,592,172 | Nippert | Apr. 8, 1952 |
| 2,628,417 | Peyches | Feb. 17, 1953 |

UNITED STATES PATENT OFFICE
CERTIFICATE OF CORRECTION

Patent No. 2,798,604                                                        July 9, 1957

George B. Todd

It is hereby certified that error appears in the printed specification of the above numbered patent requiring correction and that the said Letters Patent should read as corrected below.

Column 1, line 21, for "filed April, 1952" read -- filed April 1, 1952 --; column 4, line 7, for "intial" read -- initial --.

Signed and sealed this 20th day of August 1957.

(SEAL)
Attest:

KARL H. AXLINE
Attesting Officer

ROBERT C. WATSON
                                                                        Commissioner of Patents